(12) United States Patent
Browne et al.

(10) Patent No.: US 8,534,064 B2
(45) Date of Patent: Sep. 17, 2013

(54) AUTONOMOUS FLUID MIXING SYSTEM AND METHOD

(75) Inventors: Alan L. Browne, Grosse Pointe, MI (US); Nancy L. Johnson, Northville, MI (US); James Holbrook Brown, Costa Mesa, CA (US); Xiujie Gao, Troy, MI (US); Paul W. Alexander, Ypsilanti, MI (US)

(73) Assignees: GM Global Technology Operations LLC, Detroit, MI (US); Dynalloy, Inc., Costa Mesa, CA (US)

( * ) Notice: Subject to any disclaimer, the term of this patent is extended or adjusted under 35 U.S.C. 154(b) by 708 days.

(21) Appl. No.: 12/639,823

(22) Filed: Dec. 16, 2009

(65) Prior Publication Data

US 2011/0139396 A1     Jun. 16, 2011

(51) Int. Cl.
*F01B 29/10*   (2006.01)
*F02G 1/04*    (2006.01)

(52) U.S. Cl.
USPC ............................................. 60/527

(58) Field of Classification Search
USPC .................................................. 60/527–529
See application file for complete search history.

(56) References Cited

U.S. PATENT DOCUMENTS

| | | | | |
|---|---|---|---|---|
| 4,055,955 A | * | 11/1977 | Johnson | 60/527 |
| 4,150,544 A | * | 4/1979 | Pachter | 60/527 |
| 4,785,627 A | * | 11/1988 | Al-Jaroudi | 60/527 |
| 4,996,842 A | * | 3/1991 | Goldstein | 60/527 |
| 5,003,779 A | * | 4/1991 | Goldstein | 60/527 |
| 5,442,914 A | * | 8/1995 | Otsuka | 60/527 |
| 6,367,281 B1 | * | 4/2002 | Hugenroth | 62/467 |
| 6,891,302 B1 | * | 5/2005 | Gabrys | 310/178 |
| 7,444,812 B2 | * | 11/2008 | Kirkpatirck et al. | 60/528 |
| 2006/0162331 A1 | * | 7/2006 | Kirkpatirck et al. | 60/527 |
| 2008/0103635 A1 | * | 5/2008 | Vuk et al. | 700/300 |
| 2009/0021106 A1 | * | 1/2009 | Baughman et al. | 310/300 |
| 2009/0043288 A1 | * | 2/2009 | Petrakis | 604/890.1 |
| 2009/0277169 A1 | * | 11/2009 | Usoro et al. | 60/527 |
| 2011/0139395 A1 | * | 6/2011 | Browne et al. | 165/41 |
| 2011/0139396 A1 | * | 6/2011 | Browne et al. | 165/41 |
| 2011/0165981 A1 | * | 7/2011 | Alexander et al. | 474/202 |

OTHER PUBLICATIONS

Kauffman, George B. Memory Metal, Oct. 1993. American Chemical Society. ChemMatters, p. 4.*

* cited by examiner

*Primary Examiner* — Thomas Denion
*Assistant Examiner* — Brian Inacay
(74) *Attorney, Agent, or Firm* — Quinn Law Group, PLLC

(57) ABSTRACT

A vehicle includes a fluid mixing system. The fluid mixing system includes a fluid and a heat engine. The fluid has a first fluid region at a first temperature and a second fluid region at a second temperature that is different from the first temperature. The heat engine includes a shape-memory alloy disposed in heat exchange contact with each of the first fluid region and the second fluid region. The heat engine is operable to mix the fluid between the first fluid region and the second fluid region in response to a change in the crystallographic phase of the shape-memory alloy to reduce the difference in the composition of the fluid bath between the first fluid region and the second fluid region.

16 Claims, 2 Drawing Sheets

AUTONOMOUS FLUID MIXING SYSTEM AND METHOD

TECHNICAL FIELD

The present invention generally relates to a vehicle, and more specifically, to an arrangement for mixing a fluid bath based on the existing of temperature differences between regions of the fluid bath.

BACKGROUND OF THE INVENTION

Vehicles are traditionally powered by engines which provide drive for the vehicle and batteries, which provide power for starting the engine and for vehicle accessories. The vehicle systems and accessory systems generate heat and require cooling. Fluids are typically pumped from a fluid source to cool and lubricate these components. In the process, the fluids themselves absorb heat from the components they are cooling. When the fluid is returned to the fluid source there may be uneven heat distribution among the returning fluid and the fluid that is already in the fluid source. For example, the transmission fluid is heated as it is used to lubricate and cool the transmission. However, the heat distribution of the fluid within a transmission sump is often uneven. Uneven heat distribution within the fluid source may lead to less efficient cooling of the associated vehicle system.

SUMMARY OF THE INVENTION

A vehicle includes a fluid source for a vehicle system. The fluid source has a first fluid region having a first temperature and a second fluid region having a second temperature that is different from the first temperature. A heat engine which includes a pseudoplastically pre-strained shape-memory alloy is located within the fluid source and in heat exchange contact with the first fluid region and the second fluid region. The heat engine is operable to mix the fluid between the first fluid region and the second fluid region in response to the crystallographic phase of the shape-memory alloy to thereby reduce any differences in the temperature and composition of the fluid bath between the first fluid region and the second fluid region.

A fluid mixing system includes a heat engine. A first fluid region is at a first temperature and a second fluid region is at a second temperature that is different from the first temperature. The heat engine includes a pseudoplastically pre-strained shape-memory alloy disposed in heat exchange contact with each of the first fluid region and the second fluid region. The heat engine is operable to mix the fluid between the first fluid region and the second fluid region in response to a change in the crystallographic phase of the shape-memory alloy.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
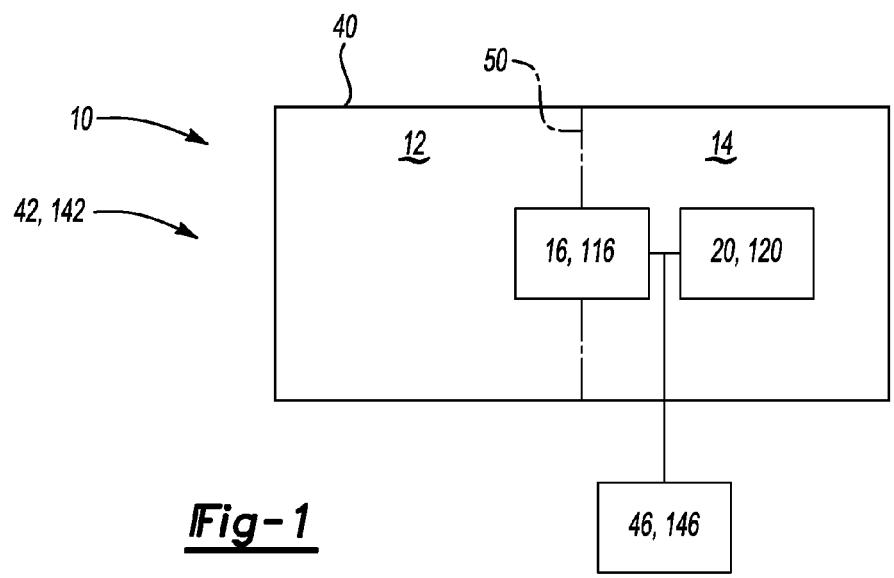
FIG. 1 is a schematic diagram of a vehicle having a fluid mixing system.

Referring to the Figures, wherein like reference numerals refer to like elements, a vehicle is shown generally at 10 in FIG. 1. The vehicle 10 includes a fluid mixing system 42. The fluid mixing system 42 utilizes the temperature difference between a first fluid region 12 and a second fluid region 14 to drive a heat engine 16. The heat engine 16 mixes the fluid between the first fluid region 12 and the second fluid region 12 to distribute heat between the first fluid region 12 and the second fluid region 14 and to reduce the temperature differential and mixing the fluid to reduce any spatial differences in the contents of the fluid bath. It is to be appreciated that the fluid mixing system 42 may also be useful for non-automotive applications, such as fluidized beds of solids like grain silos, waste treatment facilities, etc.

The vehicle 10 includes a fluid source 40 for a vehicle system. The fluid source 40 may provide fluid to lubricate and cool the power and drive sources for the vehicle 10, such as an engine and transmission (not shown). For example, the fluid source 40 may be a transmission sump, a radiator fluid supply, etc. One skilled in the art would be able to determine fluid sources in a vehicle 10 that have a spatial temperature differential that may take advantage of the fluid mixing system 42.

The fluid source 40 is enclosed from the surrounding environment, although it likely includes at least one fluid inlet and outlet (not shown) for pumping fluid through the associated vehicle 10 system. The fluid mixing system 42 is at least partially located within the fluid source 40. The power and drive sources (not shown) for the vehicle 10 typically generate heat. Fluid within the fluid source 40 absorbs this heat. However, the temperature of the fluid may not be evenly distributed. For example, fluid adjacent to the fluid inlet (not shown) may have a higher temperature than fluid adjacent to a fluid outlet. Therefore, the fluid source 40 includes the first fluid region 12 and the second fluid region 14 having a temperature difference therebetween. The fluid within the fluid mixing system 42 forming the first fluid region 12 and the second fluid region 14 may be selected from a group of gases, liquids, fluidized beds of solids and combinations thereof.

Figure 2:
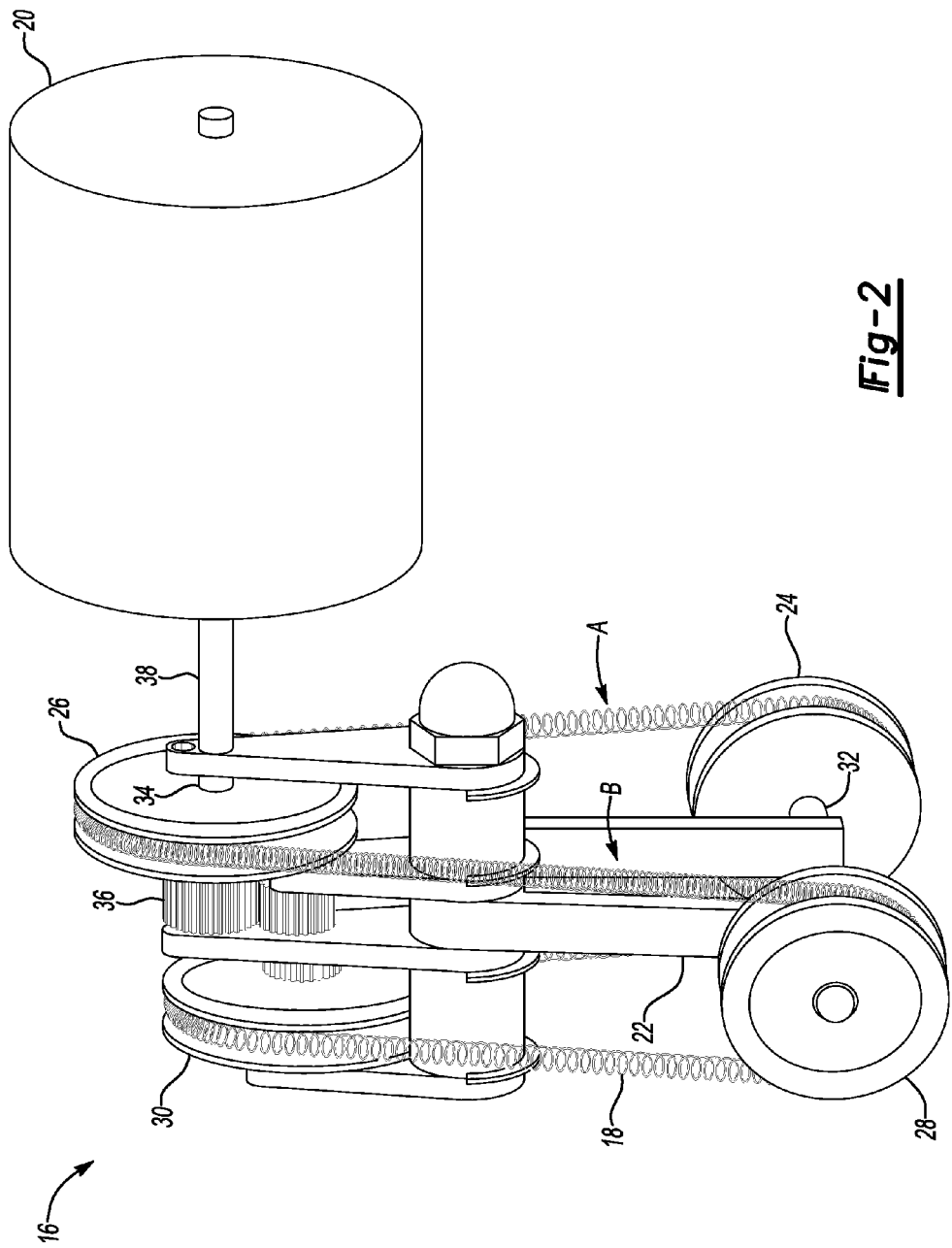
FIG. 2 is a perspective view of a first embodiment of the fluid mixing system of FIG. 1.

Referring now to FIGS. 1 and 2, the fluid mixing system 42 includes the heat engine 16. The heat engine 16 is configured for converting thermal energy, e.g., heat, to mechanical energy, as set forth in more detail below. More specifically, the heat engine 16 includes a shape-memory alloy 18 (FIG. 2) in thermal contact or heat exchange relation with the first fluid region 12 and the second fluid region 14 and having a crystallographic phase changeable between austenite and martensite in response to the temperature difference between the first fluid region 12 and the second fluid region 14 (FIG. 1).

Operation of the heat engine 16 mixes the composition of the fluid between the first fluid region 12 and the second fluid region 14. More specifically, the mixing of the fluid between the first fluid region 12 and the second fluid region 14 results in heat transfer between the first fluid region 12 and the second fluid region 14 to thereby reduce the temperature differential. Heat is transferred when it is absorbed by the shape-memory alloy 18 in one of the first fluid region 12 and the second fluid region 14 and when it is desorbed from the shape-memory alloy 18 in the other of the first fluid region 12 and the second fluid region 14. Additionally, the fluid in the first fluid region 12 and the second fluid region 14 is mixed through the fluid currents created by the operation of the heat engine 16. If further mixing of the contents of the fluid bath is required a component 20, such as a fan, may be secured to the heat engine 16 and driven thereby. The component 20 may increase the fluid flow from one of the first fluid region 12 and the second fluid region 14 to the other of the first fluid region 12 and the second fluid region 14. As the heat engine 16 operates, the fluid within the fluid source 40 is mixed and the temperature differential between the first fluid region 12 and the second fluid region 14 is reduced. The heat engine 16 will continue to operate as long as there is a sufficient temperature differential between the first fluid region 12 and the second fluid region 14. Operation of the heat engine 16 is further described below.

As used herein, the terminology "shape-memory alloy" refers to alloys which exhibit a shape-memory effect. That is, the shape-memory alloy 18 may undergo a solid state phase change via crystalline rearrangement to shift between a martensite phase, i.e., "martensite", and an austenite phase, i.e., "austenite". Stated differently, the shape-memory alloy 18 may undergo a displacive transformation rather than a diffusional transformation to shift between martensite and austenite. In general, the martensite phase refers to the comparatively lower-temperature phase and is often more deformable than the comparatively higher-temperature austenite phase. The temperature at which the shape-memory alloy 18 begins to change from the austenite phase to the martensite phase is known as the martensite start temperature, $M_s$. The temperature at which the shape-memory alloy 18 completes the change from the austenite phase to the martensite phase is known as the martensite finish temperature, $M_f$. Similarly, as the shape-memory alloy 18 is heated, the temperature at which the shape-memory alloy 18 begins to change from the martensite phase to the austenite phase is known as the austenite start temperature, $A_s$. And, the temperature at which the shape-memory alloy 18 completes the change from the martensite phase to the austenite phase is known as the austenite finish temperature, $A_f$.

Therefore, the shape-memory alloy 18 may be characterized by a cold state, i.e., when a temperature of the shape-memory alloy 18 is below the martensite finish temperature $M_f$ of the shape-memory alloy 18. Likewise, the shape-memory alloy 18 may also be characterized by a hot state, i.e., when the temperature of the shape-memory alloy 18 is above the austenite finish temperature $A_f$ of the shape-memory alloy 18.

In operation, i.e., when exposed to the temperature difference of the fluids 12, 14, the shape-memory alloy 18 can change dimension upon changing crystallographic phase to thereby convert thermal energy to mechanical energy. That is, the shape-memory alloy 18, may change crystallographic phase from martensite to austenite accompanied by a dimensional contraction—if, and only if, it has been previously psuedoplastically pre-strained by the application of stress—so as to convert thermal energy to mechanical energy. Conversely, the shape-memory alloy 18 may change crystallographic phase from austenite to martensite and thereby dimensionally expand, i.e. pseudoplatically strain, if under stress so as to be reset and ready to convert thermal energy to mechanical energy.

The terminology "pseudoplastically pre-strained" refers to stretching the shape-memory alloy element 18 while the shape-memory alloy element 18 is in the martensite phase so that the strain exhibited by the shape-memory alloy element 18 under loading is not fully recovered when unloaded. That is, upon unloading, the shape-memory alloy element 18 appears to have plastically deformed, but when heated to the austenite start temperature, $A_s$, the strain can be recovered so that the shape-memory alloy element 18 returns to the original length observed prior to any load being applied. Additionally, the shape-memory alloy element 18 may be stretched before installation in the heat engine 16, such that the nominal length of the shape-memory alloy 18 includes that recoverable pseudoplastic strain, which provides the motion used for driving the heat engine 16.

The shape-memory alloy 18 may have any suitable composition. In particular, the shape-memory alloy 18 may include an element selected from the group including cobalt, nickel, titanium, indium, manganese, iron, palladium, zinc, copper, silver, gold, cadmium, tin, silicon, platinum, gallium, and combinations thereof. For example, suitable shape-memory alloys 18 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The shape-memory alloy 18 can be binary, ternary, or any higher order so long as the shape-memory alloy 18 exhibits a shape memory effect, e.g., a change in shape orientation, damping capacity, and the like. A skilled artisan may select the shape-memory alloy 18 according to desired operating temperatures within the fluid source 40 (FIG. 1), as set forth in more detail below. In one specific example, the shape-memory alloy 18 may include nickel and titanium.

Further, the shape-memory alloy 18 may have any suitable form, i.e., shape. For example, the shape-memory alloy 18 may have a form selected from the group including springs, tapes, wires, bands, continuous loops, and combinations thereof. Referring to FIG. 2, in one variation, the shape-memory alloy 18 may be formed as a continuous loop spring.

The shape-memory alloy 18 may convert thermal energy to mechanical energy via any suitable manner. For example, the shape-memory alloy 18 may activate a pulley system (shown generally in FIG. 2 and set forth in more detail below), engage a lever (not shown), rotate a flywheel (not shown), engage a screw (not shown), and the like.

Referring again to FIGS. 1 and 2, the fluid mixing system 42 may include the driven component 20. The component 20 may be a simple mechanical device, such as a fan, which is driven by the heat engine 16 to increase the fluid mixing between the first fluid region 12 and the second fluid region 14 (shown in FIG. 1). The mechanical energy from the heat engine 16 may drive the component 20. Driving the component 20 with power provided by the heat engine 16 allows the fluid mixing system 42 to operate autonomously from other systems of the vehicle 10. Mixing the fluid within the first fluid region 12 and the second fluid region 14 to reduce the temperature gradient and differences in the composition of the fluid bath therebetween may assist the associated system within the vehicle 10 to be more efficient.

Referring to FIG. 2, when the mixing system 42 includes the component 20 for further fluid mixing, the component 20 is driven by the heat engine 16. In particular, the aforementioned dimensional contraction and the dimensional expansion of the shape-memory alloy 18 coupled with the changes in modulus may drive the component 20. That is, mechanical energy resulting from the conversion of thermal energy by the shape-memory alloy 18 may drive the component 20 as the heat engine 16 operates to reduce the temperature gradient between the first fluid region 12 and the second fluid region 14.

In one variation shown in FIG. 2, the heat engine 16 may include a frame 22 configured for supporting one or more wheels 24, 26, 28, 30 disposed on a plurality of axles 32, 34. The wheels 24, 26, 28, 30 may rotate with respect to the frame 22, and the shape-memory alloy 18 may be supported by, and travel along, the wheels 24, 26, 28, 30. Speed of rotation of the wheels 24, 26, 28, 30 may optionally be modified by one or more gear sets 36. Moreover, the component 20 may include a drive shaft 38 attached to the wheel 26. As the wheels 24, 26, 28, 30 turn about the axles 32, 34 of the heat engine 16 rotates in response to the dimensionally expanding and contracting shape-memory alloy 18. Heat is transferred between the first fluid region 12 and the second fluid region 14 when it is absorbed by the shape-memory alloy 18 in one area and when it is desorbed from the shape-memory alloy 18 in another area. Additionally, the fluid between the first fluid region 12 and the second fluid region 14 is mixed through the fluid currents within the fluid source 40 created by the operation of the heat engine 16. If further mixing of fluid between the first fluid region 12 and the second fluid region 14 is required the component 20 may be secured to the heat engine 16 through drive shaft 38, and driven thereby.

Referring again to FIG. 1, the fluid mixing system is shown generally at 42. The fluid mixing system 42 includes structure defining the first fluid region 12 having a first temperature and includes structure defining the second fluid region 14 having a second temperature that is different from the first temperature. For example, the first temperature may be higher than the second temperature. The temperature difference between the first temperature and the second temperature may be as little as about 5° C. and no more than about 300° C.

The greater the temperature difference between the first temperature and the second temperature the faster the shape-memory alloy 18 will rotate the wheels 24, 2 6, 28, 30. The faster operation of the heat engine 16 results from decreasing heating and cooling times of the shape-memory alloy 18 in the first fluid region 12 and the second fluid region 14. As the temperature differential between the first fluid region 12 and the second fluid region 14 is reduced, the heat engine 16 will operate at lower speeds. The fluid in the first fluid region 12 and the second fluid region 14 will mix at a greater rate as the temperature differential increases and will mix at a lower rate as the temperature difference decreases.

As shown generally in FIG. 1, the heat engine 16, and more specifically, the shape-memory alloy 18 (FIG. 2) of the heat engine 16, is disposed in thermal contact or heat exchange relation with each of the first fluid region 12 and the second fluid region 14. Therefore, the shape-memory alloy 18 may change crystallographic phase between austenite and martensite upon contact with one of the first fluid region 12 and the second fluid region 14. For example, upon thermal contact or heat exchange relation with the first fluid region 12, the shape-memory alloy 18 may change from martensite to austenite. Likewise, upon thermal contact or heat exchange relation with the second fluid region 14, the shape-memory alloy 18 may change from austenite to martensite.

Further, the shape-memory alloy 18 may change both modulus and dimension upon changing crystallographic phase to thereby drive the heat engine 16. More specifically, the shape-memory alloy 18 may sufficiently dimensionally contract upon changing crystallographic phase from martensite to austenite if psuedoplastically pre-strained and may sufficiently dimensionally expand, if under stress, upon changing crystallographic phase from austenite to martensite to thereby drive the heat engine 16 and mix the fluid within the first fluid region 12 and the second fluid region 14. Therefore, for any condition wherein the temperature difference exists between the first temperature of the first fluid region 12 and the second temperature of the second fluid region 14, i.e., wherein the first fluid region 12 and the second fluid region 14 are not in thermal equilibrium, the shape-memory alloy 18 may dimensionally expand and contract upon changing crystallographic phase between martensite and austenite. And, the change in crystallographic phase of the shape-memory alloy 18 may cause the shape-memory alloy to rotate the pulleys 24, 26, 28, 30, thus, mixing the fluid between the first fluid region 12 and the second fluid region 14 and reducing the temperature differential and any difference in the composition of the fluid bath therebetween. When the temperature differential between the first fluid region 12 and the second fluid region 14 is reduced below a minimum level the shape-memory alloy 18 will no longer have a crystallographic phase change and the heat engine 16 will stop operating until the temperature differential again rises above the minimum level. To provide more continuous mixing of the fluid bath the shape-memory alloy 18 may be selected to operate with a low temperature gradient between the first fluid region 12 and the second fluid region 14.

In operation, with reference to the heat exchange system 42 of FIG. 1 and described with respect to the example configuration of the shape-memory alloy 18 shown in FIG. 2, one wheel 28 may be immersed in or in heat exchange relation with the first fluid region 12 while another wheel 24 may be immersed in or in heat exchange relation with the second fluid region 14. As one area (generally indicated by arrow A) of the shape-memory alloy 18 dimensionally expands, i.e. dimensionally stretches if under stress, when in contact with the second fluid region 14, another area (generally indicated by arrow B) of the shape-memory alloy 18 in contact with the first fluid region 12 dimensionally contracts if pseudoplastically pre-strained. Alternating dimensional contraction and expansion of the continuous spring loop form of the shape-memory alloy 18 upon exposure to the temperature difference between the first fluid region 12 and the second fluid region 14 may cause the shape memory alloy 18 to convert potential mechanical energy to kinetic mechanical energy, thereby driving the pulleys 24, 26, 28, and converting thermal energy to mechanical energy.

Referring again to FIG. 1, the heat engine 16 may be disposed within the fluid source 40 in any location as long as the shape-memory alloy 18 is disposed in thermal contact or heat exchange relation with each of the first fluid region 12 and the second fluid region 14. Further, the heat engine 16 may be surrounded by a vented housing 44 (FIG. 1) to allow fluid flow while protecting the heat engine 16. A sufficient heat exchange barrier 50 may be located within the housing 44 or fluid source 40 to separate the first fluid region 12 from the second fluid region 14 and to assist in creating fluid flow paths within the fluid source 40.

Referring now to FIG. 1, in one variation, the fluid mixing system 42 also includes an electronic control unit 46. The electronic control unit 46 is in operable communication with the vehicle 10. The electronic control unit 46 may be, for example, a computer that electronically communicates with one or more controls and/or sensors of the fluid mixing system 42. The electronic control unit 46 may control the operation of the fluid mixing system 42 under predetermined conditions. An electronic control unit 46 may also provide the option to manually override to allow the fluid mixing system 42 to be turned off.

It is to be appreciated that for any of the aforementioned examples, the vehicle 10 and/or the fluid mixing system 42 may include a plurality of heat engines 16. That is, one vehicle 10 may include more than one heat engine 16 and/or fluid mixing systems 42. For example, that vehicle 10 may include more than one fluid mixing system 42, each including at least one heat engine 16.

Figure 3:
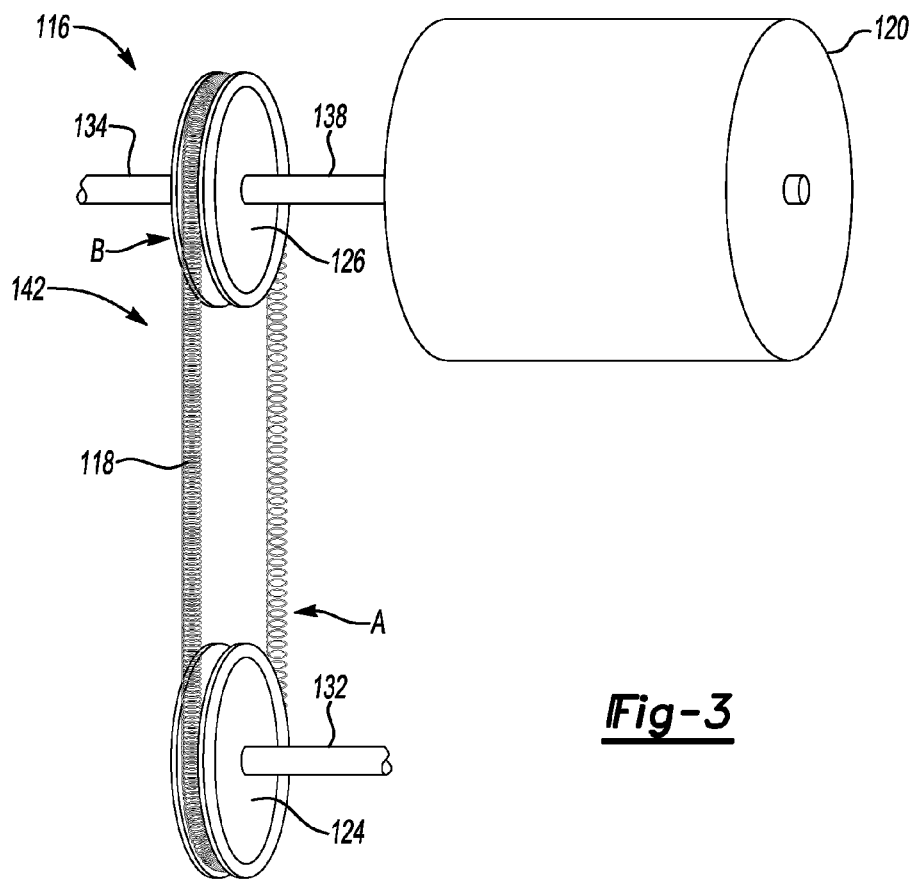
FIG. 3 is a perspective view of a second embodiment of the fluid mixing system of FIG. 1.

Referring to the FIG. 3, a second embodiment of a heat engine 116 for a fluid mixing system 142 is illustrated. The heat engine 116 includes a shape-memory alloy 118 having a crystallographic phase changeable between austenite and martensite in response to the temperature difference of the first fluid region 12 and the second fluid region 14 (FIG. 1). The shape-memory alloy 118 operates in a similar manner to the shape-memory allow 18 as described above. Further, the shape-memory alloy 118 may have any suitable form, i.e., configuration or shape. For example, the shape-memory alloy 118 may have a form selected from the group including springs, tapes, wires, bands, continuous loops, and combinations thereof.

Operation of the heat engine 116 causes heat to move from one of the first fluid region 12 and the second fluid region 14 to the other of the first fluid region 12 and the second fluid region 14 until a temperature differential therebetween is reduced. Mixing of the fluid occurs through the fluid currents within the fluid source 40 created by the operation of the heat engine 116. If further mixing from one of the first fluid region 12 and the second fluid region 14 is required a component 120, such as a fan, may be secured to the heat engine 116 and driven thereby. The component 120 may increase the mixing of fluid between the first fluid region 12 and the second fluid region 14. As the heat engine 116 operates, the fluid within the fluid source 40 is mixed and the temperature differential and any difference in the composition of the fluid bath between the first fluid region 12 and the second fluid region 14 are reduced. The heat engine 116 will to continue to operate as long as there is a sufficient temperature differential between the first fluid region 12 and the second fluid region 14. Operation of the heat engine 116 is further described below.

The component 120 may be a simple mechanical device, such as a fan, which is driven by the heat engine 116 to increase the fluid mixing between the first fluid region 12 and the second fluid region 14 (shown in FIG. 1). The mechanical energy from the heat engine 116 may drive the component 120. Driving the component 120 with power provided by the heat engine 116 allows the fluid mixing system 142 to operate autonomously from other systems of the vehicle 10. Mixing the fluid within the first fluid region 12 and the second fluid region 14 to reduce the temperature gradient and any difference in the composition of the fluid bath therebetween may assist the associated system within the vehicle 10 to be more efficient.

The heat engine 116 may include wheels 124 and 126 disposed on a plurality of axles 132 and 134. The axles 132 and 134 may be supported by various components of the vehicle 10. The wheels 124 and 126 may rotate with respect to the vehicle 10 components, and the shape-memory alloy 118 may be supported by, and travel along, the wheels 124 and 126. The component 120 may include a drive shaft 138 attached to the wheel 126. As the wheels 124 and 126 turn about the axles 132 and 134 in response to the dimensionally expanding and contracting shape-memory alloy 118, the drive shaft 138 rotates and mixes the fluid in the first fluid region 12 and the second fluid region 14.

Referring to FIGS. 1 and 3, the heat engine 116, and more specifically, the shape-memory alloy 118 of the heat engine 116, is disposed in contact with each of the first fluid region 12 and the second fluid region 14. Therefore, the shape-memory alloy 118 may change crystallographic phase between austenite and martensite upon thermal contact or heat exchange relation with one of the first fluid region 12 and the second fluid region 14. For example, upon thermal contact or heat exchange relation with the first fluid region 12, the shape-memory alloy 18 may change from martensite to austenite. Likewise, upon thermal contact or heat exchange relation with the second fluid region 14, the shape-memory alloy 118 may change from austenite to martensite.

Further, the shape-memory alloy 118 may change dimension upon changing crystallographic phase to thereby drive the heat engine 116. More specifically, the shape-memory alloy 118 may dimensionally contract if pseudoplastically pre-strained upon changing crystallographic phase from martensite to austenite and may dimensionally expand upon changing crystallographic phase from austenite to martensite if under tensile stress to thereby convert thermal energy to mechanical energy. Therefore, for any condition wherein the temperature difference exists between the first temperature of the first fluid region 12 and the second temperature of the second fluid region 14, i.e., wherein the first fluid region 12 and the second fluid region 14 are not in thermal equilibrium, the shape-memory alloy 118 may dimensionally expand and contract upon changing crystallographic phase between martensite and austenite. And, the change in crystallographic phase of the shape-memory alloy 118 may cause the shape-memory alloy to rotate the pulleys 124 and 126 and, thus, mixing the fluid between the first fluid region 12 and the second fluid region 14 and reducing the temperature differential and any difference in the composition of the fluid bath therebetween. When the temperature differential between the first fluid region 12 and the second fluid region 14 is reduced below a minimum level the shape-memory alloy 118 will no longer have a crystallographic phase change and the heat engine 116 will stop operating until the temperature differential again rises above the minimum level.

In operation, one wheel 128 may be immersed in or in heat exchange relation with the first fluid region 12 while another wheel 124 may be immersed in or in heat exchange relation with the second fluid region 14. As one area (generally indicated by arrow A) of the shape-memory alloy 118 under applied tensile stress dimensionally expands when in thermal contact or heat exchange relation with the second fluid region 14, another area (generally indicated by arrow B) of the shape-memory alloy 118 in thermal contact or heat exchange relation with the first fluid region 12 that is pseudoplastically strained dimensionally contracts. Alternating dimensional contraction and expansion of the continuous spring loop form of the shape-memory alloy 18 upon exposure to the temperature difference between the first fluid region 12 and the second fluid region 14 may cause the pulleys 124 and 126 to rotate in response to the dimensionally expanding and contracting shape-memory alloy 118 along with the accompanying change in modulus. Fluid, and thus heat, is transferred when the fluid is mixed through the fluid currents within the fluid source 40 created by the operation of the heat engine 116. If further mixing of fluid between the first fluid region 12 and the second fluid region 14 is required the component 120 may be secured to the heat engine 16 through drive shaft 38, and driven thereby.

Referring again to FIG. 1, the heat engine 116 may be disposed within the fluid source 40 in any location as long as the shape-memory alloy 118 is disposed in thermal contact or heat exchange relation with each of the first fluid region 12 and the second fluid region 14. Further, the heat engine 116 may be surrounded by a vented housing 44 (FIG. 1) to allow fluid flow while protecting the heat engine 116. A sufficient heat exchange barrier 50 may be located within the housing 44 or fluid source 40 to separate the first fluid region 12 from the second fluid region 14 and to assist in creating fluid flow paths within the fluid source 40.

In one variation, the fluid mixing system 142 also includes an electronic control unit 146. The electronic control unit 146 is in operable communication with the vehicle 10. The electronic control unit 146 may be, for example, a computer that electronically communicates with one or more controls and/or sensors of the fluid mixing system 142. The electronic control unit 146 may control the operation of the fluid mixing system 42 under predetermined conditions. The electronic control unit1 146 may also provide the option to manually override to allow the fluid mixing system 142 to be turned off.

It is to be appreciated that for any of the aforementioned examples, the vehicle 10 and/or the fluid mixing system 142 may include a plurality of heat engines 116. That is, one vehicle 10 may include more than one heat engine 116 and/or fluid mixing systems 142. For example, that vehicle 10 may include more than one fluid mixing system 142, each including at least one heat engine 116.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a fluid source for a vehicle system wherein the fluid source includes;
an inlet and an outlet;
a first fluid region proximate to the inlet and having a first temperature; and
a second fluid region proximate to the outlet and having a second temperature different from the first temperature;
a heat engine including a pseudoplastically pre-strained shape-memory alloy in heat exchange contact with the first fluid region and the second fluid region, wherein the shape-memory alloy has a crystallographic phase changeable between austenite and martensite in response to a temperature difference between the first fluid region and the second fluid region; and
wherein the heat engine is operable to mix the fluid between the first fluid region and the second fluid region through fluid currents that are created by the operation of the heat engine in response to the crystallographic phase change of the shape-memory alloy to reduce the difference in temperature between the first fluid region and the second fluid region.

2. The vehicle of claim 1, further comprising a fan driven by said heat engine to increase the mixing of fluid between the first fluid region and the second fluid region.

3. The vehicle of claim 2, wherein said change in crystallographic phase of said shape-memory alloy drives said component.

4. The vehicle of claim 1, wherein said shape-memory alloy changes dimension upon changing crystallographic phase to thereby mix fluid between the first fluid region to the second fluid region.

5. The vehicle of claim 4, wherein said shape-memory alloy changes crystallographic phase from martensite to austenite and thereby when pseudopplastically prestrained dimensionally contracts so as to transfer fluid from one of the first fluid region and the second fluid region to the other of the first fluid region and the second fluid region.

6. The vehicle of claim 4, wherein said shape-memory alloy changes crystallographic phase from austenite to martensite and thereby when under stress dimensionally expands so as to mix the fluid between the first fluid region and the second fluid region.

7. The vehicle of claim 1, wherein said shape-memory alloy has a form selected from the group of springs, tapes, wires, bands, continuous loops, and combinations thereof.

8. The vehicle of claim 1, wherein said shape-memory alloy includes nickel and titanium.

9. The vehicle of claim 1, wherein the fluid source is a transmission sump.

10. The vehicle of claim 1, wherein the fluid source is a radiator fluid supply.

11. The vehicle of claim 1, wherein the heat engine is entirely disposed within the fluid source.

12. A vehicle comprising:
a fluid source for a vehicle system wherein the fluid source includes;
an inlet and an outlet;
a first fluid region proximate to the inlet and having a first temperature; and
a second fluid region proximate to the outlet and having a second temperature different from the first temperature;
a heat engine including a pseudoplastically pre-strained shape-memory alloy in heat exchange contact with the first fluid region and the second fluid region, wherein the shape-memory alloy has a crystallographic phase changeable between austenite and martensite in response to a temperature difference between the first fluid region and the second fluid region; and
wherein the heat engine is operable to mix the fluid between the first fluid region and the second fluid region through fluid currents that are created by the operation of the heat engine in response to the crystallographic phase change of the shape-memory alloy to reduce the difference in temperature between the first fluid region and the second fluid region.

13. The vehicle of claim 12, further comprising a fan driven by said heat engine to increase the mixing of fluid between the first fluid region and the second fluid region.

14. The vehicle of claim 12, wherein the fluid source is selected from the group consisting of a transmission sump and a radiator fluid supply; and
wherein the heat engine is entirely disposed within the fluid source.

15. A vehicle comprising:
a fluid source selected from the group consisting of a transmission sump and a radiator fluid supply, the fluid source including;
a fluid disposed within the fluid source;
an inlet and an outlet;
a first fluid region proximate to the inlet and having a first fluid temperature; and
a second fluid region proximate to the outlet and having a second fluid temperature that is different from the first fluid temperature;
a heat engine entirely disposed within the fluid source and including a pseudoplastically pre-strained shape-memory alloy in heat exchange contact with both the first fluid region and the second fluid region, wherein the shape-memory alloy has a crystallographic phase changeable between austenite and martensite in response to a temperature difference between the first fluid region and the second fluid region; and
wherein the heat engine is operable to mix the fluid between the first fluid region and the second fluid region through fluid currents that are created by the operation of the heat engine in response to the crystallographic phase change of the shape-memory alloy, and wherein the fluid currents are operative to reduce the difference in temperature between the first fluid region and the second fluid region.

16. The vehicle of claim 15, further comprising a fan driven by said heat engine to increase the mixing of fluid between the first fluid region and the second fluid region.

* * * * *